United States Patent
Ganzer et al.

(10) Patent No.: US 8,383,991 B2
(45) Date of Patent: Feb. 26, 2013

(54) ADHESIVE DISPENSING SYSTEM WITH SPACED PORTS AND RELATED METHODS

(75) Inventors: Charles P. Ganzer, Cumming, GA (US); David R. Jeter, Woodstock, GA (US); Brett A. Pearson, Duluth, GA (US); Charles M. Saunders, Suwanee, GA (US)

(73) Assignee: Nordson Corporation, Westlake, OH (US)

( * ) Notice: Subject to any disclaimer, the term of this patent is extended or adjusted under 35 U.S.C. 154(b) by 1122 days.

(21) Appl. No.: 12/249,534

(22) Filed: Oct. 10, 2008

(65) Prior Publication Data

US 2009/0095730 A1 Apr. 16, 2009

Related U.S. Application Data

(60) Provisional application No. 60/979,676, filed on Oct. 12, 2007.

(51) Int. Cl.
*B29B 17/02* (2006.01)
*B65G 53/00* (2006.01)
*B65G 53/10* (2006.01)
*B65G 53/60* (2006.01)

(52) U.S. Cl. ........... 219/421; 222/146.5; 406/127; 406/157; 406/163; 406/171

(58) Field of Classification Search ............ None
See application file for complete search history.

(56) References Cited

U.S. PATENT DOCUMENTS

| | | | |
|---|---|---|---|
| 2,774,792 A | 5/1956 | Finn | |
| 3,030,153 A * | 4/1962 | Krenke et al. | 406/173 |
| 3,186,768 A | 6/1965 | Pendelton | |
| 3,580,644 A * | 5/1971 | Ballard, Jr. | 406/30 |
| 4,583,885 A | 4/1986 | Thiele | |
| 4,659,293 A | 4/1987 | Evenson | |
| 5,006,018 A | 4/1991 | Depew | |
| 5,006,019 A | 4/1991 | Dziedzic, Jr. et al. | |
| 5,378,089 A | 1/1995 | Law | |
| 5,791,830 A | 8/1998 | Fort et al. | |
| 6,039,513 A | 3/2000 | Law | |
| 6,095,803 A | 8/2000 | Slater | |
| 6,352,173 B1 | 3/2002 | Duckworth | |
| 6,740,851 B2 | 5/2004 | Woodlief et al. | |
| 2005/0093403 A1 | 5/2005 | Raterman et al. | |
| 2005/0274740 A1 | 12/2005 | Duckworth et al. | |
| 2007/0080157 A1 | 4/2007 | Mehaffy et al. | |

FOREIGN PATENT DOCUMENTS

FR 2787770 A1 6/2000

OTHER PUBLICATIONS

Melton SE, B42 Series Systems PUR Adhesive Melters 42L, Brochure, Rev_0070307.

* cited by examiner

*Primary Examiner* — Joseph M Pelham
(74) *Attorney, Agent, or Firm* — Wood, Herron & Evans, L.L.P.

(57) ABSTRACT

An adhesive melter includes an inlet port, an outlet port, and an interior configured to heat and hold adhesive pellets. The melter includes a lid for providing access to the interior and the outlet port communicates with the interior. An intake conduit is coupled to the inlet port and is configured to deliver forced air and adhesive pellets to the interior. An exhaust conduit is coupled to the outlet port and is configured to remove the forced air from the interior and to receive a filter for trapping particles of the adhesive pellets borne by the forced air. The outlet port and the inlet port are non-concentric but closely spaced and centrally located on the lid and the outlet port is spaced from the inlet port so as to cause the forced air to travel in a generally U-shaped path within the interior of the melter.

17 Claims, 4 Drawing Sheets

ADHESIVE DISPENSING SYSTEM WITH SPACED PORTS AND RELATED METHODS

This application claims the priority of U.S. Provisional Application Ser. No. 60/979,676 filed on Oct. 12, 2007, the disclosure of which is fully incorporated by reference herein.

TECHNICAL FIELD

The invention relates generally to adhesive dispensing systems and, more particularly, to adhesive dispensing systems supplied by air-supported conveyance of adhesive pellets.

BACKGROUND

Thermoplastic adhesives, otherwise known as "hot melt" adhesives, have been widely used in industry for various applications. Hot melt adhesives may be dispensed in many ways, but often are dispensed by systems having one or more dispensing guns coupled by heated hoses to a melter. The melter may include a tank for melting and storing the hot melt adhesive, a manifold having multiple distribution outlets for coupling with a heated hose, and a pump for transferring the hot melt adhesive from the tank through the manifold. Adhesive material may be supplied to the melter in solid or semi-solid form, where it is heated and melted to a desired temperature. Examples of such melters are the ProBlue™ melter units available from Nordson Corporation of Westlake, Ohio.

In use, conventional melters may be fed adhesive material in the form of pellets through an air or vacuum supply conduit. The pressurized airflow used to force pellets through the supply conduit is then removed from the melter via an exhaust passage. In conventional melters, the exhaust passage is located in the path of the pellets. This type of configuration limits the flow area for the exhaust passage and may cause excessive turbulent airflow to develop within the melter.

The turbulent air flow and the stickiness of adhesive pellets in the heated environment of conventional melters cause the dust and fines of the adhesive to accumulate on the surfaces of the supply conduit and the exhaust passage. This accumulation of dust and fines, in turn, may lead to rapid clogging of the exhaust opening and/or a filter associated with the exhaust opening, thereby requiring frequent cleaning of passages and replacement of the filter. This may result in downtime to facilitate cleaning of the adhesive dispensing system.

The problem with clogging of filters may be especially noticeable in melters that have a relatively small size, and where the top wall or the lid offer a relative small surface area. Melters of this type may, for example, have a configuration in which the supply conduit and exhaust passage are concentric with one another and in which the exhaust passage surrounds the supply conduit. In melters of this type, the dust and fines of the adhesive may impact the inner surfaces of the supply passage and accumulate on those surfaces, which may require frequent cleaning, as a result. In addition, in melters of this type, the dust and fines may accumulate on a filter associated with the supply conduit, thereby requiring frequent replacement of the filter.

It is desirable, therefore, to have an adhesive dispensing system that addresses these and other problems associated with conventional melters of the type described above.

SUMMARY

An illustrative embodiment of the invention provides an adhesive melter that includes an inlet port, an outlet port, and an interior configured to heat and hold adhesive pellets. The melter includes a lid for providing access to the interior and the outlet port communicates with the interior. An intake conduit is coupled to the inlet port and is configured to deliver forced air and adhesive pellets to the interior. An exhaust conduit is coupled to the outlet port and is configured to remove the forced air from the interior and to receive a filter for trapping particles of the adhesive pellets borne by the forced air. The outlet port and the inlet port are non-concentric but closely spaced and centrally located on the lid and the outlet port is spaced from the inlet port so as to cause the forced air to travel in a generally U-shaped path within the interior of the melter.

The generally U-shaped path is defined by a first generally vertical segment extending from the inlet port, a second generally vertical segment extending from the outlet port, and a transverse segment directly connecting the first and second generally vertical segments. Such an airflow path, for example, permits laminar rather than turbulent flow of the forced air through the interior of the melter and to the surrounding exterior. Such an airflow path can also, for example, use the inertia of the adhesive pellets to travel only into the interior of the melter rather than also through the outlet port, which at least minimizes build up of adhesive on the surfaces of the intake and exhaust conduits and/or clogging of a filter that may be associated with the exhaust port.

The system may also include a filter associated with the exhaust conduit. The filter may, for example, be a sock filter. The exhaust conduit may include a hose with a proximal end coupled to the lid and a distal end such that the filter is spaced from the lid and attached to the distal end of the hose.

The melter may include a control panel for controlling delivery of the adhesive pellets to the interior of the melter. The inlet and outlet ports may respectively have first and second cross-sectional areas, with the second cross-sectional area being larger than the first cross-sectional area. For example, the second cross-sectional area may be at least about four times as large as the first cross-sectional area. The first and second cross-sectional areas may be defined in a common plane on the lid of the melter.

The inlet port and the outlet port may have respective centers and respective diameters, with the distance between the centers in the range of about 2.3 to about 2.4 times the diameter of the inlet port. Additionally or alternatively, the distance between the centers may be about 1.2 times the diameter of the outlet port.

In another embodiment, an adhesive melter includes an inlet port, an outlet port, and an interior configured to heat and hold adhesive pellets. The melter includes a lid for providing access to the interior and the outlet port communicates with the interior. An intake conduit is coupled to the inlet port and is configured to deliver forced air and adhesive pellets to the interior. An exhaust conduit is coupled to the outlet port and is configured to remove the forced air from the interior and to receive a filter for trapping particles of the adhesive pellets borne by the forced air. The outlet port and the inlet port are non-concentric but closely spaced and centrally located on the lid.

A deflective barrier is associated with the outlet port and is configured to deflect adhesive leaving the interior of the melter. The deflective barrier may have a generally horizontal orientation and may additionally be in confronting relation with the outlet port. The system may include a second deflective barrier associated with the inlet port, having a generally horizontal orientation, and configured to deflect the forced air entering the interior of the melter.

In yet another embodiment, a method of supplying adhesive pellets to an adhesive melter includes supplying forced air to direct the adhesive pellets into an interior of the melter along a first path. The forced air is removed from the interior of the melter along a second path and is directed along a transverse path that directly communicates the first and second paths. The forced air may be filtered during travel of the forced air along the second path.

The method may include directing the forced air through a lid configured to provide access to the interior of the melter. In a specific embodiment, the method includes supplying the forced air into the interior of the melter at a first speed and removing the forced air from the interior of the melter at a second speed that is less than the first speed. Alternatively or additionally, the method may include pressurizing the forced air with a pressure not greater than about 80 psi.

In another embodiment, a method of supplying adhesive pellets to an adhesive melter includes supplying forced air to direct the adhesive pellets into an interior of the melter along a first path and removing the forced air from the interior of the melter along a second path non-concentric with but closely positioned to the first path. The second path is blocked to prevent adhesive from leaving the interior of the melter. The method may include deflecting the forced air entering the melter.

As discussed above, the configuration of the inlet and outlet ports of the embodiments herein described permit a separation of the flow of forced air and adhesive pellets through the exhaust port, which results in the minimization of build-up and clogging of a filter that may be associated with the exhaust passage. This configuration also minimizes the amount of build-up of adhesive dust and fines on the surfaces of the inlet conduit that is coupled to the inlet port of the melter. In embodiments having a deflective barrier associated with the outlet port, the clogging of a filter that may be associated with the exhaust passage is further minimized by the deflective barrier, which blocks particles of the adhesive from reaching the filter.

Various additional features and aspects will be more readily appreciated upon review of the following detailed description of the illustrative embodiments taken in conjunction with the accompanying drawings.

DETAILED DESCRIPTION

Figure 1:
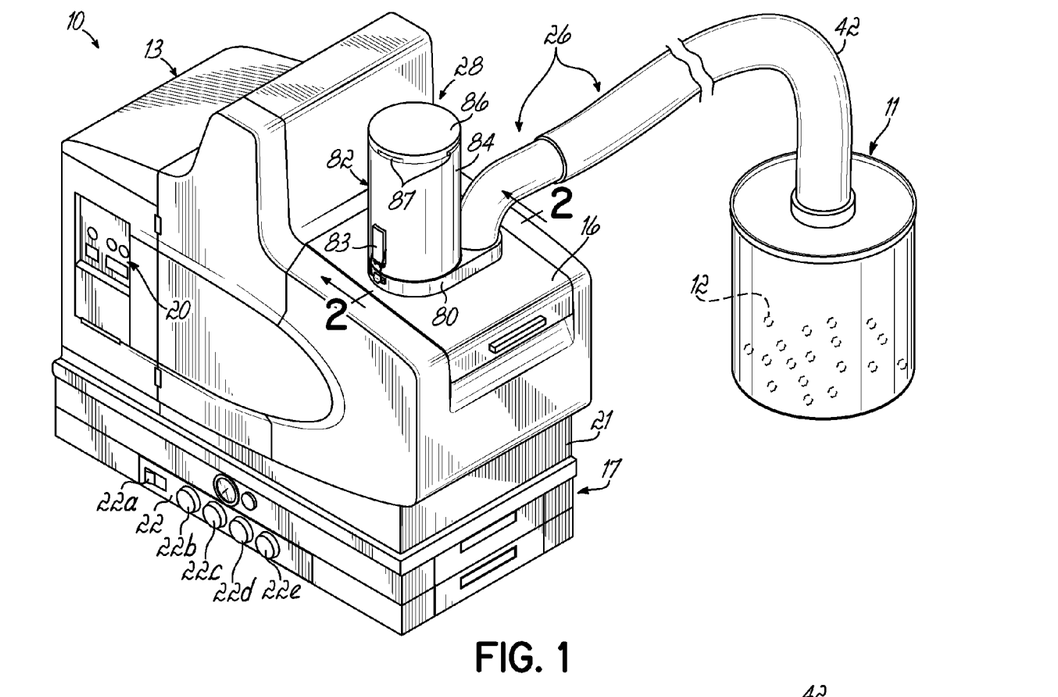
FIG. 1 is a perspective view of an embodiment of an adhesive dispensing system.
Figure 2:
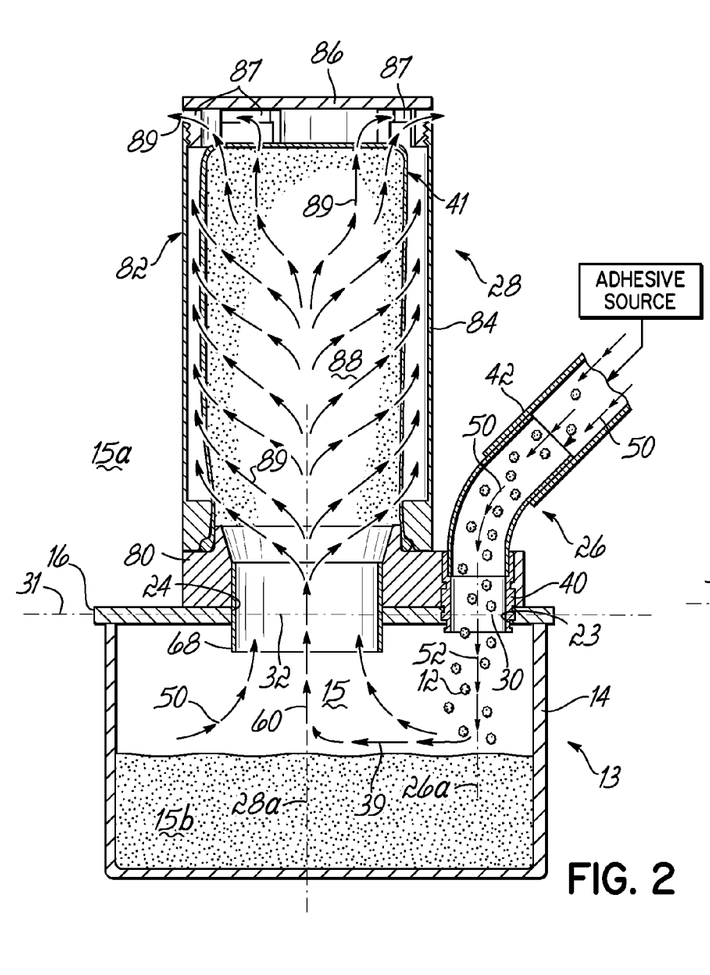
FIG. 2 is a schematic cross-sectional view taken along line 2-2 of FIG. 1.

With reference to FIGS. 1-2, an adhesive dispensing system 10 includes a feed container 11 that supplies adhesive pellets 12 to a melter 13 for subsequent dispensing thereof to an adhesive dispensing unit or applicator (not shown). The melter 13 is configured to heat and hold the adhesive pellets 12 received from the feed container 11. To this end, melter 13 includes a tank 14 having an interior 15 that defines a suitably chosen interior volume so as to hold a desired amount of adhesive therein, and a lid 16 defining a top wall of the melter 13. Lid 16 is coupled to the melter 13 and provides access to the adhesive held in the tank 14 of melter 13. Melter 13 includes a modular base 17 as well as a main control panel 20 that controls conditions of the adhesive held in the melter 13, in ways well known in the art.

As used herein, the term "adhesive pellets" is not intended to be limiting as to any specific shape, size, or configuration of solid or semi-solid adhesive, so long as the adhesive pellets are suitable to be carried by a stream of forced air such as a vacuum-driven stream. For example, and without limitation, adhesive pellets may have regular shapes, irregular shapes or any combinations thereof. Moreover, any two pellets may have distinct shapes and/or dimensions and still be jointly and generally referred to as "adhesive pellets."

In this exemplary embodiment, a control panel 22 is coupled to the modular base 17 for controlling delivery of the adhesive pellets 12 to the melter 13. In this illustrative embodiment, the control panel 22 includes a switch 22a for turning on and off at least a portion of dispensing system 10 to enable delivery of the adhesive pellets 12 to the melter 13, as well as a "power on" light 22b that indicates when such portion of the system 10 is turned on. A second light 22c indicates if and when adhesive pellets are flowing from the feed container 11 to the melter 13. A warning light 22d of control panel 22 comes on to indicate when the flow of adhesive pellets 12 into interior 15 of the tank 14 is insufficient. In this regard, warning light 22d indicates, for example, a low level of adhesive pellets 12 in the feed container or a clogged conduit in the system 10. A buzzer 22e of the control panel 22 cooperates with the warning light 22d to audibly alert the user or operator of the condition that caused the warning light 22d to come on. In operation, a sensor (not shown) in the melter 13 is configured to detect a level of adhesive in interior 15 of melter 13 and send a signal to a control device to cause the dispensing system to deliver adhesive pellets 12 from the feed container 11 to the melter 13.

With continued reference to FIGS. 1-2, the lid 16 serves different purposes. For example, as noted above, lid 16 provides access to the contents of the melter 13 that are held within tank 14, thereby limiting or preventing contamination of the adhesive therein. Likewise, the lid 16 limits the loss of heat from the interior 15 of melter 13 into the surrounding environment. Lid 16 also provides operative fluid communication with the feed container 11 thereby enabling the feeding of adhesive pellets 12 into the melter 13. In this regard, the lid 16 includes an inlet port 23 and an outlet port 24 communicating with interior 15 of the melter 13 and to which respective intake and exhaust conduits 26, 28 are coupled. In this embodiment, the inlet and outlet ports 23, 24 are generally round in shape, although this is intended to be merely exemplary as other alternative shapes are contemplated. Further in this embodiment, the inlet and outlet ports 23, 24 are centrally located on the lid 16 and are non-concentric but closely spaced to one another.

Figure 2A:
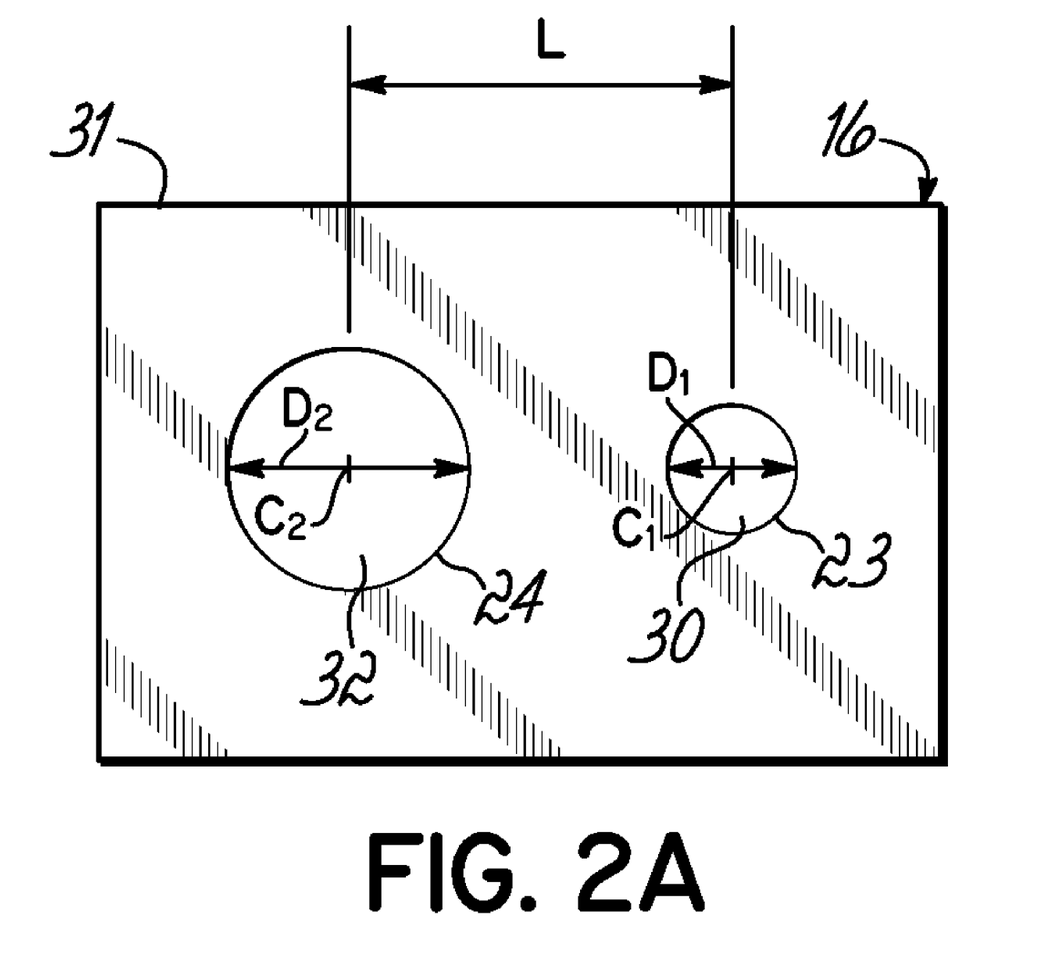
FIG. 2A is a schematic top view showing an inlet port and an outlet port of a melter of the system of FIG. 1.

With reference to FIGS. 1-2 and 2A, the inlet port 23 is spaced from the outlet port 24 and has a first diameter $D_1$ that defines a first cross-sectional area 30 in a plane 31 defined by lid 16. The outlet port 24 has a second diameter $D_2$ that defines a second cross-sectional area 32 also in plane 31 defined by lid 16 and which may be about the same size as the first cross-sectional area 30 or different therefrom. In particular, the second cross-sectional area 32 may be larger than the first cross-sectional area 30, as shown in FIG. 2A. For example, and without limitation, the second diameter may be at least about twice as large as the first diameter, thereby resulting in a second cross-sectional area 32 that is at least about four times as large as the first cross-sectional area 30. In this non-limiting exemplary embodiment, the diameter $D_1$ of the inlet port 23 is in the range of about 1 5/16 to about 1 3/8 inches and the diameter $D_2$ of the outlet port 24 is in the range of about 2 5/8 to about 2 3/4 inches.

The separation of the inlet and outlet ports 23, 24 from one another, as well as the ratio between the first and second cross-sectional areas 30, 32 jointly determine the flow rate of air through the outlet port 24. Moreover, these two characteristics determine whether the flow through outlet port 24 is laminar or turbulent. Laminar flow may be desirable in some applications. For example, in systems of this type, laminar flow may be desirable since a high degree of turbulence may lead to heavier particles of the adhesive pellets 12 flowing through a forced air exhaust or outlet port, thereby rapidly clogging a filter that may be attached thereto. Accordingly, a larger size of the cross-sectional area of the outlet port 24 relative to that of the inlet port 23 results in a decrease in the velocity of the air flowing through the outlet port 24. This lower velocity reduces turbulence, thereby preventing heavier particles of the adhesive pellets 12 from flowing from the interior of the melter 13 and through outlet port 24.

Maximum separation between the inlet and outlet ports 23, 24 from one another, as permitted by the shape and dimensions of melter 13, further facilitates the generation of laminar flow of forced air through outlet port 24. To this end, for example, the inlet and outlet ports 23, 24 may be respectively disposed adjacent opposite sides of the melter 13 or opposite edges of the lid 16. In the illustrative embodiment of FIGS. 1-2 and 2A, the inlet and outlet ports 23, 24 are spaced such that a distance L defined between respective centers $C_1$, $C_2$ of the inlet and outlet ports 23, 24, is about 3.2 inches. Accordingly, the spacing between the inlet and outlet ports 23, 24 in this embodiment is such that the distance L between the centers $C_1$, $C_2$ is in the range of about 2.3 to about 2.4 times the diameter $D_1$ of the inlet port 23 and about 1.2 times the diameter $D_2$ of the outlet port 24.

While the illustrative embodiment of FIGS. 1-2 and 2A depict the first and second cross sectional areas 30, 32 lying in a common plane 31, those of ordinary skill in the art will readily appreciate that, alternatively, the first and second cross-sectional areas 30, 32 may be in different planes defined by lid 16 or in different planes defined by different components of the melter 13. For example, and without limitation, the first cross-sectional area may be in a plane defined by one of the side walls of the melter 13 while the second cross-sectional area may be in a plane defined by another side wall of the melter 13. Likewise, while the inlet and outlet ports 23, 24 are depicted as round and the respective conduits 26, 28 are depicted having round cross-sectional shapes, other suitably chosen shapes for the ports and/or conduits are contemplated and still maintain the size relationship described above with respect to inlet and outlet ports 23, 24 and/or the type of flow of air through them. Such shapes may for example be regular and irregular polygonal and include planar sides, arcuate sides or any combinations thereof.

The exemplary intake conduit 26 defines a first central axis 26a and includes a fill pipe 40 that is directly connected to the lid 16 and a flexible hose 42 coupled to the fill pipe 40, although other configurations and/or structures are contemplated to provide coupling between intake conduit 26 and lid 16. The flexible hose 42 is coupled to the feed container 11 establishing, as noted above, fluid communication between the feed container 11 and melter 13. The feed container 11 is diagrammatically depicted and may take on any suitable shape or form including, without limitation, open containers and closed containers and may further be positioned in any orientation and/or position relative to the melter 13. For example, the feed container 11 may take the form of the closed cylindrical container depicted in FIG. 1. The feed container 11 may include other suitably chosen components (not shown) such as components providing agitation via pressurized air or any other vibratory mechanical devices. In this regard, these components may facilitate moving the adhesive pellets 12 into position to be transported through the intake conduit 26.

With continued reference to FIGS. 1, 2 and 2A, the intake conduit 26 is also configured to deliver a stream of forced air 50 into the melter 13 to thereby facilitate delivery of the adhesive pellets 12 into the melter 13. More particularly, the adhesive pellets 12 are borne by the stream of forced air 50 from the feed container 11 into the melter 13. To this end, intake conduit 26 and/or feed container 11 may include a venturi or similar device (not shown) that is adapted to generate a vacuum force that directs the adhesive pellets 12 into the path of the forced air 50 and through the intake conduit 26. Accordingly, the forced air 50 and the adhesive pellets 12 flow through the flexible hose 42, fill pipe 40 and into the melter 13 to define a first path (indicated by arrow 52) followed by forced air 50. Alternatively, either intake conduit 26 or feed container 11 (or any structure there between) may include an air blowing device or similar to direct the adhesive pellets 12 out of the feed container 11 and toward the melter 13. The forced air 50 may further be pressurized to facilitate control of the forced air as it is directed into the melter 13. For example, and without limitation, the forced air 50 may be pressurized with a pressure not greater than about 80 psi, or for example, in the range of about 50 psi to about 80 psi.

The exhaust conduit 28 defines a second central axis 28a and provides a second path (indicated by arrow 60) followed by the forced air 50 from the melter 13 and into the surrounding environment. In this regard, the second path 60 is spaced from the first path 52 and the second central axis 28a is spaced from the first central axis 26a such that the adhesive pellets 12 do not travel along the second path 60 from the interior 15 of the melter 13. Instead, only particles of the adhesive that are borne by the forced air 50 may travel along the second path 60.

In this particular embodiment, the first and second paths 52, 60 are such that the first and second central axes 26a, 28a are generally parallel to one another, although this is only exemplary and not intended to be limiting. Moreover, the first and second paths 52, 60 define a generally U-shaped path of travel of the forced air 50 through the interior 15 of melter 13. In particular, the generally U-shaped path is defined by the first and second generally vertical paths or segments 52, 60 and a generally horizontal transverse segment 39 directly connecting the first and second paths or segments 52, 60. Accordingly, the forced air 50 travels continuously and sequentially along the first path or segment 52, the transverse segment 39 and then the second path or segment 60. While not shown, the first and second paths may instead extend into the interior 15 through a side wall of the lid 16 or other portions of melter 13 and still define a generally U-shaped path of travel of the forced air 50. As used herein, the term "particles" is intended to generally encompass powder-like matter that may, for example, be present on the surfaces of the adhesive pellets 12, adhesive fines in solid or semi-solid states, and other matter that may be carried by the forced air 50 from the interior 15 of the melter 13.

The configuration of the inlet and outlet ports 23, 24 permits use of the inertia of the pellets 12 of adhesive to facilitate their travel into the interior 15 while minimizing or preventing the exit of pellets or adhesive particles to the exterior 15a of melter 13. More specifically, the inertia of the pellets 12 permits their travel through inlet port 23 and into the interior 15, without a tendency to follow the generally U-shaped path followed by the forced air 50. To the contrary, the pellets 12 enter the interior 15 and become part of the molten adhesive 15b held by melter 13.

With continued reference to FIGS. 1, 2, and 2A the exemplary exhaust conduit 28 includes a filter 41 that is directly attached to the lid 16 and which provides filtration of the forced air 50 that leaves the melter 13. In this regard, the outlet port 24 includes a cylindrical extension or pipe 68 that provides a coupling surface for coupling of filter 41 to lid 16. More specifically, the pipe 68 cooperates with a base portion 80 of a filter housing 82 that encases filter 41. Base portion 80, in turn, is coupled to a main cylindrical portion 84 of the filter housing 82 via a clamp 83 or the like, such that decoupling of main cylindrical portion 84 from base portion 80 facilitates removal and replacement or cleaning of filter 41. Those of ordinary skill in the art will readily appreciate that the coupling described above between filter 41 and lid 16 is only illustrative and not intended to be limiting, as other suitably chosen coupling structures are contemplated. Other such structures may be used for securing the filter 41 to pipe 68.

Filter housing 82 includes a filter housing lid 86 coupled to the main cylindrical portion 84 to provide a path for the forced air 50 to travel into the surrounding environment. More particularly, filter housing lid 86 includes exhaust apertures 87, for example in a number of four and in the form of slots that permit air to leave filter housing 82. In this illustrative embodiment, filter housing lid 86 includes a screw-on type coupling with main cylindrical portion 84 although other types of coupling are contemplated. Likewise, it is contemplated that filter housing 82 may alternatively include no filter housing lid 86 at all but instead define a unitary structure, so long as it provides a path for the forced air 50 to leave the filter housing.

With particular reference to FIG. 2, forced air 50 leaves the melter 13 and follows a path generally indicated by arrows 89. In this regard, forced air 50 sequentially flows from melter 13 through outlet port 24, pipe 68, and into filter housing 82. Air within filter housing 82 is directed into an interior cavity 88 defined by filter 41 and which traps particles of the adhesive pellets 12 therein while allowing air to travel therethrough. Forced air 50 leaves the filter housing 82 through exhaust apertures 87.

The exemplary filter 41 of FIGS. 1-2 is in the form of a polyester sock or polyester felt bag filter, although this is only illustrative and not intended to be limiting. For example, the filter may have a diameter of 4 3/32 inches and a height of 8 inches and target particle sizes in the range of about 1 to about 200 microns. Filters of this type are available, for example, from the Mcmaster-Carr Supply Company of Elmhurst, Ill. Other types of filters may be chosen instead, such as, without limitation, filters including polypropylene or materials available under the trade names Nylon or Nomex.

Figure 3:
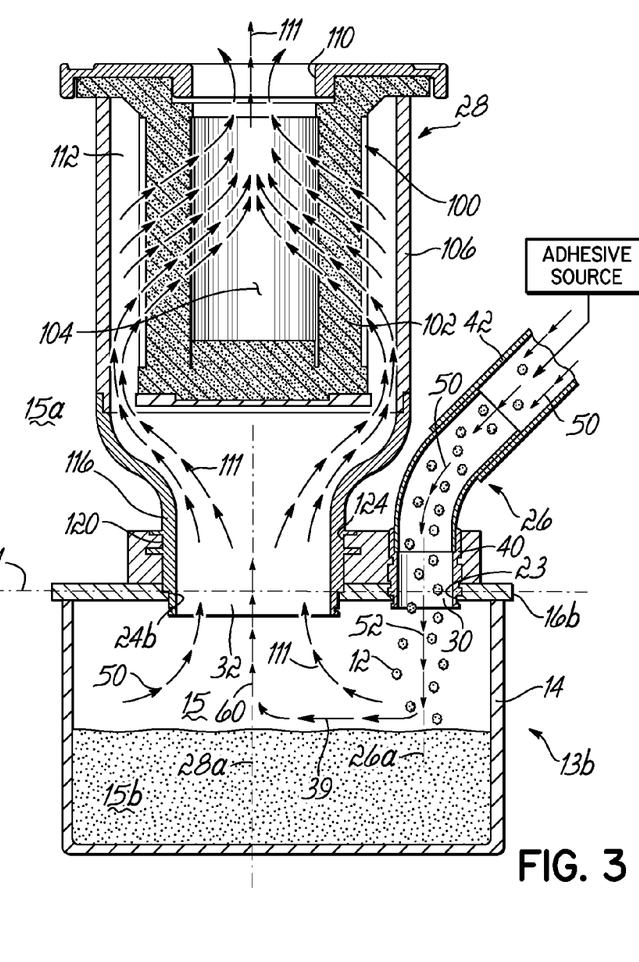
FIG. 3 is a schematic cross-sectional view similar to that of FIG. 2 showing another embodiment a filter.

With reference to FIG. 3, in which like reference numerals refer to like features of FIGS. 1,2, and 2A another embodiment of a filter 100 is depicted which may be used with other portions of the adhesive dispensing system 10 (FIGS. 1,2, and 2A). Filter 100 is in the form of a canister filter, for example, of a type available in the automotive industry. Filter 100 is a cylindrical structure that is defined by a porous pleated sleeve 102 surrounding a central channel 104. A filter housing 106 encases the filter 100 and facilitates coupling thereof to a lid 16b of melter 13. Filter housing 106 includes a central aperture 110 that is in general registration with central channel 104 to thereby facilitate the travel of forced air 50 from within filter housing 106 and into the surrounding environment. In this regard, therefore, particles of the adhesive pellets 12 that are borne by the forced air 50 are trapped by the pleated sleeve 102 and prevented from traveling with the forced air 50 into the surrounding environment. Accordingly, forced air 50 follows a path generally indicated by arrows 111, thus sequentially flowing from melter 13, into an outer perimeter 112 defined between filter housing 106 and pleated sleeve 102 and through the pleated sleeve 102 into central channel 104. Forced air 50 exits the filter housing 106 by flowing, as discussed above, along central channel 104, through central aperture 110 and into the surrounding environment.

Filter housing 106 illustrates a coupling configuration with lid 16b that is different from that described above with respect to the embodiment of FIGS. 1, 2, and 2A. In this regard, filter housing 106 includes a reduced diameter cylindrical base portion 116 that is received within an outlet port 24b of lid 16b. Moreover, cylindrical base portion 116 defines a groove 120 that cooperates with a rim 124 of lid 16b to thereby lockingly engage filter housing 106 relative to lid 16b. It is contemplated that other coupling configurations or components may be alternatively used to permit coupling of the filter housing 106 with lid 16b (or generally between filter 100 and lid 16b), as the configuration described above with respect to FIG. 3 is merely illustrative and therefore not intended to be limiting.

Figure 4:
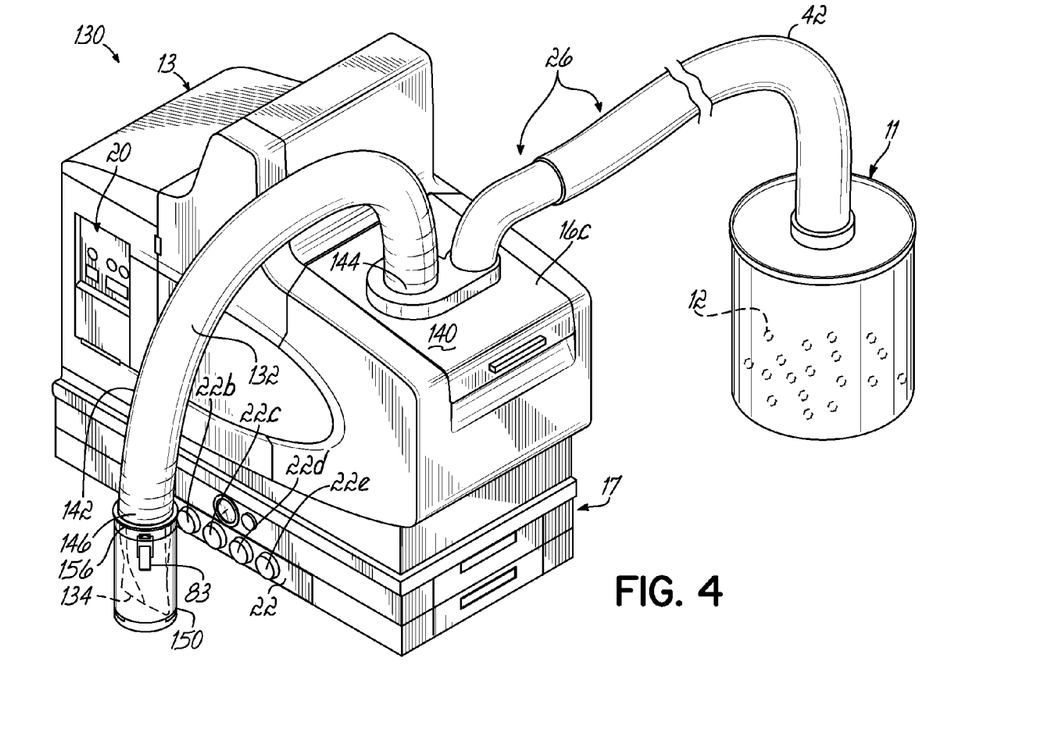
FIG. 4 is a perspective view of another embodiment of an adhesive dispensing system.

With reference to FIG. 4, in which like reference numerals refer to like features of FIGS. 1-3, another embodiment of an adhesive dispensing system 130 includes components similar to those of adhesive dispensing system 10, the details of which may be referred to for an understanding of adhesive dispensing system 130 as well. Adhesive dispensing system 130 includes an exhaust conduit 132 that is coupled to a lid 16c of melter 13 and which includes a filter 134 that is spaced from lid 16c and which is similar to filter 41 of FIGS. 1-2. More particularly, filter 134 is disposed remotely from lid 16c, for example, to prevent fluids (e.g., water) used to clean an outer surface 140 of lid 16c from wetting or at least contacting filter 134. To this end, exhaust conduit 132 is in the form of a flexible hose 142 such that a proximal end 144 thereof is coupled to the lid 16c while a distal end 146 of the flexible hose 142 is coupled to filter 134.

Coupling of filter 134 to the distal end 146 of flexible hose 142 is facilitated by a filter housing 150 that encases filter 134 and which includes a coupling portion that cooperates with distal end 146 to permit such coupling. To this end, filter housing 150 includes a flexible base extension 156 that can be formed or simply made to conform to the distal end 146. A hose clamp (not shown) or the like can be used to secure the base extension 156 to distal end 146 of the flexible hose 142. Accordingly, forced air 50 (FIG. 2) flows from melter 13 through the flexible hose 142 and into the surrounding environment in ways similar to that described with respect to the embodiment of FIGS. 1, 2, and 2A. While this embodiment shows filter 134 taking the form of a polyester sock filter (such as filter 41 of FIGS. 1-2), this is merely exemplary. Thus, those of ordinary skill in the art will readily appreciate that, alternatively, filter 134 may take the form of the pleated filter described with reference to the embodiment of FIG. 3 or any other suitably chosen type of filter, so long as it prevents or at least limits the exhaust of particles of the adhesive into the surrounding environment. Likewise, while the embodiments of FIGS. 1-4 depict inlet and outlet ports disposed in a lid of the melter, it is contemplated that they may be alternatively disposed on other components of the melter 13, such as, and without limitation, on one or more side walls defining the melter 13.

Figure 5:
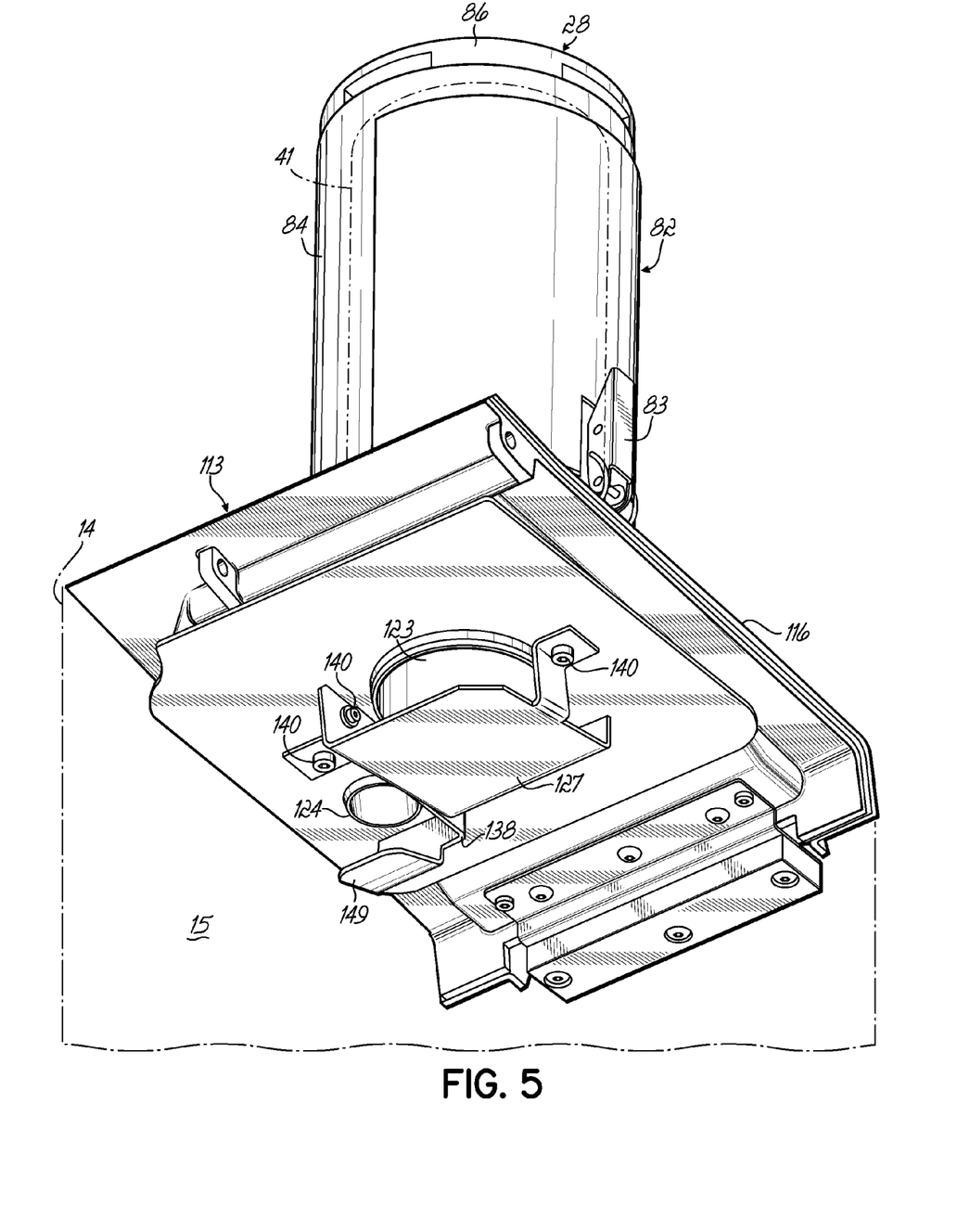
FIG. 5 is a perspective view of an embodiment of a lid of a melter forming part of an adhesive dispensing system.

With reference to FIG. 5, in which like reference numerals refer to like features of FIGS. 1-2, another embodiment of a melter 113 is similar to melter 13 of FIGS. 1-2, the description of which may be referred-to for an understanding of the structure and functions of melter 113 as well. Melter 113 includes a lid 116 having respective inlet and outlet ports 123,124 similar to inlet and outlet ports 23, 24 of melter 13. A first deflective barrier 127 is disposed in the interior 15 of the melter 113 and positioned in confronting relationship with the inlet port 123. More specifically, first deflective barrier 127 is coupled to an underside of lid 116 through a supporting structure in the form of a bracket mount 138, for example, through mechanical fasteners such as bolts or screws 140 and/or through welding or similar methods of attachment.

The first deflective barrier 127 has a generally horizontal orientation. In this regard, for example, first deflective barrier 127 may be either substantially parallel to the underside of the lid 116 or it may be slightly angled relative thereto. For example and without limitation, the first deflective barrier 127 may be angled by about 10° relative to the underside of the lid 116 and still be "generally horizontal." The first deflective barrier 127 is spaced from the underside of lid 116 and from the inlet port 123, in this embodiment, by about ¾ inches, although this is merely exemplary rather than limiting. In operation, first deflective barrier 127 deflects the forced air 50 traveling into the interior 15 of the melter 113. This deflection prevents the air from directly impinging upon the adhesive being held in the interior 15 of melter 113. This may be desirable, for example, to prevent the "peeling" of a top layer of the adhesive in the interior 15.

A second deflective barrier or baffle 149 is disposed in the interior 15 of the melter 113 and positioned in confronting relationship with the outlet port 124. The second deflective barrier 149 has a generally horizontal orientation and is, in this embodiment, generally coplanar with the first deflective barrier 127. In this regard, like the first deflective barrier 127, the second deflective barrier 149 may also be either substantially parallel to the underside of the lid 116 or it may be slightly angled (e.g., by about 10°) relative thereto and still be considered "generally horizontal." The second deflective barrier 149 is spaced from the underside of the lid 116 and from the outlet port 124, in this embodiment, by about ¾ inches. The second deflective barrier 149 is coupled to the underside of lid 116 of melter 113 through some of the same devices and/or methods discussed above with respect to the coupling of the first deflective barrier 127 to lid 116. In this particular embodiment, for example, second deflective barrier 149 is coupled to the underside of lid 116 through the bracket mount 138 that also supports the first deflective barrier 127, although this type of support is merely illustrative rather than limiting.

The second deflective barrier 149 blocks access of the adhesive particles through outlet port 124, thereby preventing or at least minimizing the amount and/or size of adhesive particles that reach the exterior of the melter 113 or that reach filter 41. This may be desirable, for example, when the melter 113 contains an adhesive having a relative low viscosity, which may have a tendency to splash upon contact of the adhesive pellets with adhesive already in the melter 113.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. An adhesive melter comprising:
   an inlet port and an outlet port;
   an interior configured to heat and hold adhesive pellets, said outlet port communicating with said interior;
   a lid for providing access into said interior;
   an intake conduit coupled to said inlet port and configured to deliver the adhesive pellets and forced air into said interior; and
   an exhaust conduit coupled to said outlet port and configured to remove the forced air from said interior and to receive a filter for trapping particles of the adhesive pellets borne by the forced air;
   wherein said outlet port and said inlet port are non-concentric but centrally located on said lid, said outlet port being spaced from said inlet port so as to cause the forced air to travel in a generally U-shaped path within said interior, said generally U-shaped path defined by a first generally vertical segment extending from said inlet port, a second generally vertical segment extending from said outlet port, and a transverse segment directly connecting said first and second generally vertical segments,
   wherein said inlet port has a first cross-sectional area and said outlet port has a second cross-sectional area, said second cross-sectional area being at least about four times as large as said first cross-sectional area.

2. The adhesive melter of claim 1, further comprising:
   a filter associated with said exhaust conduit.

3. The adhesive melter of claim 2, wherein said filter is a sock filter.

4. The adhesive melter of claim 2, wherein said exhaust conduit includes a hose having a proximal end coupled to said lid and a distal end, said filter being spaced from said lid and coupled to said distal end of said hose.

5. The adhesive melter of claim 1, further comprising:
   a control panel for controlling delivery of the adhesive pellets to said interior.

6. The adhesive melter of claim 1, wherein said first and second cross-sectional areas are defined in a common plane on said lid.

7. The adhesive melter of claim 1, wherein said inlet port has a first center and a first diameter and said outlet port has a second center and a second diameter, the distance between said centers being in the range of about 2.3 to about 2.4 times the first diameter.

8. The adhesive melter of claim 1, wherein said inlet port has a first center and a first diameter and said outlet port has a second center and a second diameter, the distance between said centers being about 1.2 times the second diameter.

9. The adhesive melter of claim 1, wherein a center of said inlet port is spaced from a center of said outlet port by a distance not greater than about 3.2 inches.

10. An adhesive melter comprising:
    an inlet port and an outlet port;
    an interior configured to heat and hold adhesive pellets, said outlet port communicating with said interior;
    a lid for providing access into said interior;
    an intake conduit coupled to said inlet port and configured to deliver the adhesive pellets and forced air into said interior; and
    an exhaust conduit coupled to said outlet port and configured to remove the forced air from said interior and to receive a filter for trapping particles of the adhesive pellets borne by the forced air;

a first deflective barrier associated with said outlet port and configured to deflect adhesive leaving said interior; and a second deflective barrier associated with said inlet port and having a generally horizontal orientation, said second deflective barrier being configured to deflect the forced air entering said interior of said melter, wherein said outlet port and said inlet port are non-concentric but centrally located on said lid.

11. The adhesive melter of claim 10, wherein said first deflective barrier has a generally horizontal orientation and is in confronting relation with said outlet port.

12. A method of supplying adhesive pellets to an adhesive melter, comprising:

supplying forced air to direct the adhesive pellets into an interior of the melter along a first path through an inlet port having a first cross-sectional area;

removing the forced air from the interior of the melter along a second path non-concentric to the first path through an outlet port having a second cross-sectional area;

directing the forced air along a transverse path directly communicating the first and second paths; and selecting the outlet port having the first cross-sectional area at least about four times as large as the second cross-sectional area of the inlet port.

13. The method of claim 12, further comprising:
filtering the forced air during travel thereof along the second path.

14. The method of claim 12, further comprising:
directing the forced air through a lid configured to provide access to the interior of the melter.

15. The method of claim 12, further comprising:
supplying the forced air into the interior of the melter at a first speed; and
removing the forced air from the interior of the melter at a second speed less than the first speed.

16. The method of claim 12, further comprising:
pressurizing the forced air with a pressure not greater than about 80 psi.

17. A method of supplying adhesive pellets to an adhesive melter, comprising:

supplying forced air to direct the adhesive pellets into an interior of the melter along a first path;

removing the forced air from the interior of the melter along a second path non-concentric to the first path;

blocking the second path with a first deflective barrier associated with the second path to prevent adhesive from leaving the interior of the melter; and deflecting the forced air entering the interior of the melter with a second deflective barrier associated with the first path.

* * * * *